United States Patent
Kang et al.

(10) Patent No.: US 10,538,608 B2
(45) Date of Patent: Jan. 21, 2020

(54) CATALYST COMPOSITION FOR PREPARING CONJUGATED DIENE-BASED POLYMER AND CONJUGATED DIENE-BASED POLYMER PREPARED USING THE SAME

(71) Applicant: LG Chem, Ltd., Seoul (KR)

(72) Inventors: Suk Youn Kang, Daejeon (KR); Soo Young Choi, Daejeon (KR); Woo Jin Cho, Daejeon (KR); Suk Joon Yoo, Daejeon (KR); Jeong Heon Ahn, Daejeon (KR); Jin Sook Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/554,949

(22) PCT Filed: Jun. 24, 2016

(86) PCT No.: PCT/KR2016/006804
§ 371 (c)(1),
(2) Date: Aug. 31, 2017

(87) PCT Pub. No.: WO2016/209046
PCT Pub. Date: Dec. 29, 2016

(65) Prior Publication Data
US 2018/0030174 A1    Feb. 1, 2018

(30) Foreign Application Priority Data

Jun. 24, 2015 (KR) ................ 10-2015-0089906
Dec. 22, 2015 (KR) ................ 10-2015-0184236

(51) Int. Cl.
| | | |
|---|---|---|
| C08F 130/06 | (2006.01) | |
| C08F 30/04 | (2006.01) | |
| C08K 5/57 | (2006.01) | |
| C08F 136/06 | (2006.01) | |
| B60C 1/00 | (2006.01) | |
| C08L 9/00 | (2006.01) | |
| C08F 4/08 | (2006.01) | |
| C08F 4/54 | (2006.01) | |
| C08F 4/609 | (2006.01) | |
| C08F 8/32 | (2006.01) | |
| C08F 8/42 | (2006.01) | |
| C08F 36/04 | (2006.01) | |
| C08F 136/04 | (2006.01) | |
| C08F 210/12 | (2006.01) | |
| C08K 5/00 | (2006.01) | |
| C08K 5/544 | (2006.01) | |

(52) U.S. Cl.
CPC ............. *C08F 136/06* (2013.01); *B60C 1/00* (2013.01); *C08F 4/08* (2013.01); *C08F 4/545* (2013.01); *C08F 4/609* (2013.01); *C08F 8/32* (2013.01); *C08F 8/42* (2013.01); *C08F 36/04* (2013.01); *C08F 136/04* (2013.01); *C08F 210/12* (2013.01); *C08K 5/0091* (2013.01); *C08K 5/544* (2013.01); *C08K 5/57* (2013.01); *C08L 9/00* (2013.01); *C08F 2410/01* (2013.01)

(58) Field of Classification Search
CPC ....................................................... C08K 5/57
See application file for complete search history.

(56) References Cited

U.S. PATENT DOCUMENTS

| | | |
|---|---|---|
| 5,064,910 A | 11/1991 | Hattori et al. |
| 6,121,429 A | 9/2000 | Balducci et al. |
| 6,462,141 B1 | 10/2002 | Kim et al. |
| 2003/0176276 A1 | 9/2003 | Luo et al. |
| 2004/0009870 A1 | 1/2004 | Laubry |
| 2005/0038215 A1 | 2/2005 | Luo et al. |
| 2006/0030677 A1 | 2/2006 | Ozawa et al. |
| 2007/0149717 A1 | 6/2007 | Luo et al. |
| 2008/0182954 A1 | 7/2008 | Luo et al. |
| 2009/0043055 A1 | 2/2009 | Luo et al. |
| 2009/0182106 A1 | 7/2009 | Parola et al. |
| 2009/0292043 A1 | 11/2009 | Kurazumi et al. |
| 2010/0317818 A1 | 12/2010 | Hogan et al. |
| 2011/0319519 A1 | 12/2011 | Sone et al. |
| 2012/0165464 A1 | 6/2012 | Hogan et al. |

(Continued)

FOREIGN PATENT DOCUMENTS

| | | |
|---|---|---|
| CN | 1139603 C | 2/2004 |
| CN | 101160328 A | 4/2008 |

(Continued)

OTHER PUBLICATIONS

Extended European Search Report including Written Opinion for EP16814755.1 dated May 24, 2018.
Extended European Search Report including Written Opinion for EP16814756.9 dated May 24, 2018.
Extended European Search Report including Written Opinion for EP16814757.7 dated May 24, 2018.
Friebe L et al: "Neodymium based ZieglerjNatta Catalysts and their Application in Diene Polymerization", Advances in Polymer Science. Springer, Germany, vol. 204, Jan. 1, 2006 (Jan. 1, 2006), pp. 1-154. XP002491130.

(Continued)

*Primary Examiner* — Caixia Lu
(74) *Attorney, Agent, or Firm* — Lerner, David, Littenberg, Krumholz & Mentlik, LLP

(57) ABSTRACT

The present invention provides a catalyst composition including a functionalizing agent of the following Formula 1 together with a rare earth metal compound, an alkylating agent, and a halogen compound, having good catalytic activity and polymerization reactivity and useful for the preparation of a conjugated diene-based polymer having high linearity and excellent processability, and a conjugated diene-based polymer prepared using the catalyst composition.

$$(X_1)_a—Sn—(X_2)_{4-a} \qquad \text{[Formula 1]}$$

In Formula 1, a, $X_1$, and $X_2$ are the same as defined in the disclosure.

13 Claims, 2 Drawing Sheets

(56) References Cited

U.S. PATENT DOCUMENTS

| | | |
|---|---|---|
| 2012/0165484 A1 | 6/2012 | Luo |
| 2013/0274407 A1 | 10/2013 | Cortial et al. |
| 2013/0345376 A1 | 12/2013 | Luo et al. |
| 2014/0350202 A1 | 11/2014 | Thuilliez et al. |
| 2015/0087500 A1 | 3/2015 | Bae et al. |
| 2015/0210791 A1 | 7/2015 | Ruehmer et al. |
| 2016/0237179 A1 | 8/2016 | Luo et al. |

FOREIGN PATENT DOCUMENTS

| | | | |
|---|---|---|---|
| CN | 101835807 | A | 9/2010 |
| CN | 102449002 | A | 5/2012 |
| CN | 102597026 | A | 7/2012 |
| DE | 228272 | A1 | 10/1985 |
| EP | 0919573 | A1 | 6/1999 |
| EP | 2407507 | A1 | 1/2012 |
| GB | 1480519 | A | 7/1977 |
| JP | S62256809 | A | 11/1987 |
| JP | H02018408 | A | 1/1990 |
| JP | H05331222 | A | 12/1993 |
| JP | H06107859 | A | 4/1994 |
| JP | 2001048940 | A | 2/2001 |
| JP | 2003514078 | A | 4/2003 |
| JP | 2005082735 | A | 3/2005 |
| JP | 2007186696 | A | 7/2007 |
| JP | 2008143943 | A | 6/2008 |
| JP | 2010530464 | A | 9/2010 |
| JP | 2011052103 | A | 3/2011 |
| JP | 2012241133 | A | 12/2012 |
| JP | 2013502508 | A | 1/2013 |
| JP | 2013108043 | A | 6/2013 |
| JP | 2014507550 | A | 3/2014 |
| JP | 2014177520 | A | 9/2014 |
| JP | 2016539199 | A | 12/2016 |
| KR | 20010032176 | A | 4/2001 |
| KR | 100312176 | B1 | 11/2001 |
| KR | 20080063191 | A | 7/2008 |
| KR | 20080064977 | A | 7/2008 |
| KR | 100882742 | B1 | 2/2009 |
| KR | 20120068885 | A | 6/2012 |
| KR | 20140107563 | A | 9/2014 |
| KR | 20140130678 | A | 11/2014 |
| KR | 20150037307 | A | 4/2015 |
| WO | 0018812 | A1 | 4/2000 |
| WO | 2006112450 | A1 | 10/2006 |
| WO | 2011028523 | A2 | 3/2011 |
| WO | 2015046699 | A1 | 4/2015 |
| WO | 2015050947 | A1 | 4/2015 |

OTHER PUBLICATIONS

Extended European Search Report including Written Opinion for EP16814759.3 dated Jul. 3, 2018.
Search report from International Application No. PCT/KR2016/006800, dated Oct. 5, 2016.
Search report from International Application No. PCT/KR2016/006801, dated Aug. 29, 2016.
Search report from International Application No. PCT/KR2016/006802, dated Oct. 4, 2016.
Search report from International Application No. PCT/KR2016/006804, dated Oct. 4, 2016.
U.S. Appl. No. 15/554,894, filed Aug. 31, 2017.
U.S. Appl. No. 15/554,907, filed Aug. 31, 2017.
U.S. Appl. No. 15/554,935, filed Aug. 31, 2017.
Search Report for Application No. CN201680022860.2, dated Jun. 26, 2019, pp. 1-2.
Search Report for Chinese Application No. 201680023661.3 dated Aug. 5, 2019, 2 pages.
Search Report for Chinese Application No. 201680022860.2, dated Jul. 5, 2019, 2 pages.

US 10,538,608 B2

CATALYST COMPOSITION FOR PREPARING CONJUGATED DIENE-BASED POLYMER AND CONJUGATED DIENE-BASED POLYMER PREPARED USING THE SAME

CROSS-REFERENCE TO RELATED APPLICATIONS

The present application is a national phase entry under 35 U.S.C. § 371 of International Application No. PCT/KR2016/006804, filed on Jun. 24, 2016, which claims priority from Korean Patent Application Nos. 2015-0089906, filed on Jun. 24, 2015, and 2015-0184236, filed on Dec. 22, 2015, the entire contents of which are incorporated herein by reference.

TECHNICAL FIELD

The present invention relates to a catalyst composition for preparing a conjugated diene-based polymer and a conjugated diene-based polymer prepared using the same.

BACKGROUND ART

According to the gradual increase in demand for a rubber composition in various manufacturing fields for tires, impact resistant polystyrene, the sole of shoes, golf balls, etc., the value of conjugated diene-based polymer which is a synthetic rubber, specifically, a butadiene-based polymer is increasing as an alternative material to natural rubber of which the produced amount is insufficient.

Meanwhile, in a conjugated diene-based polymer, linearity and the degree of branching greatly affect the physical properties of the polymer. In particular, with a decrease in linearity or an increase in the degree of branching, the dissolution rate and viscosity properties of the polymer increase, and as a result, the processability of the polymer is improved. However, if the degree of branching of the polymer is excessively large, molecular weight distribution is broadened, and the mechanical properties of the polymer, which influence the abrasion resistance, cracking resistance or repellency of a rubber composition may rather be deteriorated. In addition, the linearity and the degree of branching of the conjugated diene-based polymer, specifically, the butadiene-based polymer are highly dependent on the amount of cis-1,4 bonds contained in the polymer. If the amount of cis-1,4 bonds contained in the conjugated diene-based polymer increases, the linearity may increase. As a result, the polymer has good mechanical properties, thereby increasing the abrasion resistance, cracking resistance and repellency of a rubber composition.

Accordingly, various methods for preparing a conjugated diene-based polymer are being studied and developed to increase the amount of cis-1,4 bonds in a conjugated diene-based polymer and increase linearity and such that the conjugated diene-based polymer will have appropriate processability at the same time.

Particularly, a method of preparing a butadiene-based polymer using a compound of a rare earth metal such as neodymium and an alkylating agent in group I to group III, particularly, a polymerization catalyst of a composite metal composed of methyl aluminoxane has been developed. However, a polymer obtainable by the method has an insufficiently high amount of cis-1,4 bonds, and an insufficiently small amount of vinyl, such that the improving effect of physical properties is still insufficient.

As an another method, a method of preparing a butadiene-based polymer having a high amount of cis-1,4 bonds using a polymerization catalyst including a rare earth metal compound, an alkylating agent in group I to group III, and an ionic compound composed of non-coordinating anions and cations, has been developed. In the method, $Nd(OCOCCl_3)_3$ is used as the rare earth metal compound, but the polymerization activity of the metal compound is low, and the amount of vinyl bonds of the butadiene polymer is large, such that a rubber composition including the butadiene-based polymer prepared by the method attained an insufficient improvement of physical properties when compared to a rubber composition including the conventional butadiene-based polymer. In addition, the butadiene-based polymer prepared by the method has a large amount of vinyl bonds and wide molecular weight distribution.

As another method, a method of preparing a butadiene-based polymer having a large amount of cis-1,4 bonds using a polymerization catalyst composed of a rare earth metal salt composed of a halogen atom-containing component and aluminoxane, has been developed. However, a specific catalyst such as neodymium bis(trichloroacetate) (versatic acid), etc. is used, such that the polymerization activity of a neodymium salt is low, and industrial applicability is low.

Therefore, the development of a method of preparing a conjugated diene-based polymer which has high linearity and is capable of showing excellent processability, is required.

DISCLOSURE OF THE INVENTION

Technical Problem

A first task for solving of the present invention is to provide a catalyst composition which has excellent catalytic activity, useful in the preparation of a conjugated diene-based polymer having high linearity and showing excellent processability.

A second task for solving of the present invention is to provide a conjugated diene-based polymer prepared using the catalyst composition, and a method for preparing the same.

A third task for solving of the present invention is to provide a rubber composition including the conjugated diene-based polymer prepared by using the catalyst composition, and a tire part manufactured from the rubber composition.

Technical Solution

That is, according to an embodiment of the present invention, there is provided a catalyst composition for preparing a conjugated diene-based polymer including a functionalizing agent of the following Formula 1, a rare earth metal compound, an alkylating agent, and a halogen compound:

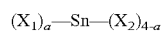   [Formula 1]

in Formula 1, a is an integer of 1 to 3, $X_1$ and $X_2$ are each independently selected from the group consisting of a hydrogen atom, monovalent $C_{1-20}$ hydrocarbon, $-OR_a$, $-NR_bR_c$, $-SiR'R''R'''$, and a covalent bonding functional group, where $R_a$, $R_b$, $R_c$, $R_d$, $R_e$ and $R_f$ are each independently selected from the group consisting of a hydrogen atom, $C_{1-20}$ alkyl, $C_{3-20}$ cycloalkyl, $C_{6-20}$ aryl, $C_{7-20}$ alkylaryl, $C_{7-20}$ aralkyl, $-SiR'R''R'''$, and a covalent bonding functional group, where R', R" and R'" are each independently selected from the group consisting of a hydrogen atom, $C_{1-20}$ alkyl, $C_{3-20}$ cycloalkyl, $C_{6-20}$ aryl, $C_{7-20}$ alkylaryl, $C_{7-20}$ aralkyl, and a covalent bonding functional group, where at least one of $X_1$ and $X_2$ includes the covalent bonding functional group, and the covalent bonding functional group is a functional group containing a carbon-carbon double bond.

In addition, according to another embodiment of the present invention, there is provided a conjugated diene-based polymer prepared by using the catalyst composition and has a mooney viscosity of 10 MU to 90 MU at 100° C. and a polydispersity of 3.4 or less.

In addition, according to a further another embodiment of the present invention, there is provided a method for preparing a conjugated diene-based polymer, including performing a polymerization reaction of conjugated diene-based monomers using the catalyst composition.

Further, according to a further another embodiment of the present invention, there are provided a rubber composition including the conjugated diene-based polymer, and a tire part manufactured by using the rubber composition.

Advantageous Effects

Since the catalyst composition for preparing a conjugated diene-based polymer according to the present invention includes a functionalizing agent which is capable of providing a functional group which may make a covalent bond during preparing a conjugated diene-based polymer, high catalytic activity and polymerization reactivity may be shown. As a result, in the preparation of a conjugated diene-based polymer using the catalyst composition, a conjugated diene-based polymer having high linearity, and excellent processability and physical properties may be prepared during preparing a conjugated diene-based polymer.

BRIEF DESCRIPTION OF THE DRAWINGS

The accompanying drawings are included to provide preferred embodiments of the inventive concept, and are incorporated with the description of the inventive concept for further understanding of the present technical spirits. The inventive concept may, however, should not be construed as limited to the accompanying drawings.

BEST MODE FOR CARRYING OUT THE INVENTION

Figure 1:
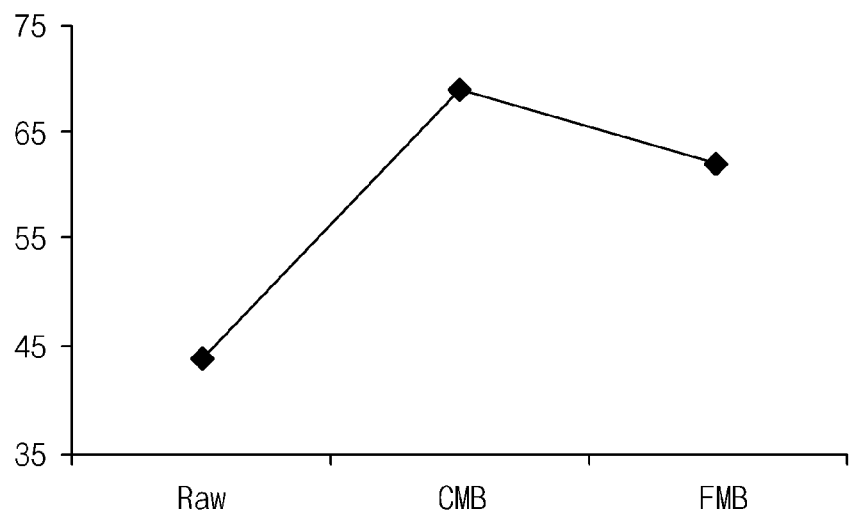
FIG. 1 is a graph obtained by observing the change of mooney viscosity (ML1+4) in accordance with the application of vulcanization or not of a rubber species which is manufactured using the conjugated diene-based polymer of Example 1.

Hereinafter, the present invention will be described in more detail in order to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "preforming" used in the present disclosure means pre-polymerization in a catalyst composition for preparing a conjugated diene-based polymer. In particular, when a catalyst composition for preparing a conjugated diene-based polymer including a rare earth metal compound, an alkylating agent including an aluminum compound, and a halogen compound, includes diisobutyl aluminum hydride (hereinafter, DIBAH) as the aluminum compound, a small amount of a monomer such as butadiene is included together to decrease the production possibility of diverse catalytically active species. Accordingly, the pre-polymerization of butadiene in the catalyst composition for preparing a conjugated diene-based polymer is performed prior to the polymerization reaction for preparing a conjugated diene-based polymer, and this process is referred to as preforming.

In addition, the term "premixing" used in the present disclosure means a homogenously mixed state of each of constituting components without being polymerized in a catalyst composition.

In addition, the terms "catalyst composition" used in the present disclosure mean a simple mixture of constituting components, diverse composites caused by physical or chemical attraction, or a chemical reaction product of constituting components.

In the present invention, a functionalizing agent including a covalent bonding functional group such as an allyl group in a molecule is used during preparing a catalyst composition for forming a conjugated diene-based polymer, and the catalytic activity and reactivity of the catalyst composition may be increased, and a conjugated diene-based polymer having high linearity and excellent processability and physical properties may be prepared.

Catalyst Composition

The catalyst composition for conjugated diene polymerization according to an embodiment of the present invention includes (a) a functionalizing agent, (b) a rare earth metal compound, (c) an alkylating agent, and (d) a halogen compound. Hereinafter, each component will be explained in detail.

(a) Functionalizing Agent

The functionalizing agent in the catalyst composition for conjugated diene polymerization according to an embodiment of the present invention is a tin (Sn)-based compound including at least one covalent bonding functional group containing a carbon-carbon double bond. The covalent bonding functional group is a functional group containing a carbon-carbon double bond such as vinyl, allyl, methallyl, and (meth)acryl, and may improve catalytic activity by the reaction with a neodymium compound which is activated by an alkylating agent in the catalyst composition, thereby stabilizing a catalytically active species and increasing the reactivity thereof.

In addition, by including Sn as a central element in the functionalizing agent, the activity of the catalyst composition may be increased, and at the same time, the processability of a conjugated diene-based polymer prepared using the same may be improved.

Particularly, the functionalizing agent may be a compound of the following Formula 1:

$(X_1)_a—Sn—(X_2)_{4-a}$ [Formula 1]

in Formula 1, a is an integer of 1 to 3, $X_1$ and $X_2$ are each independently selected from the group consisting of a hydrogen atom, monovalent $C_{1-20}$ hydrocarbon, $—OR_a$, $—NR_bR_c$, $—SiR_dR_eR_f$, and a covalent bonding functional group, where $R_a$, $R_b$, $R_c$, $R_d$, $R_e$ and $R_f$ are each independently selected from the group consisting of a hydrogen atom, $C_{1-20}$ alkyl, $C_{3-20}$ cycloalkyl, $C_{6-20}$ aryl, $C_{7-20}$ alkylaryl, $C_{7-20}$ aralkyl, $—SiR'R''R'''$, and a covalent bonding functional group, where R', R'' and R''' are each independently selected from the group consisting of a hydrogen atom, $C_{1-20}$ alkyl, $C_{3-20}$ cycloalkyl, $C_{6-20}$ aryl, $C_{7-20}$ alkylaryl, $C_{7-20}$ aralkyl, and a covalent bonding functional group, where at least one of $X_1$ and $X_2$ includes the covalent bonding functional group, and the covalent bonding functional group is a functional group containing a carbon-carbon double bond.

In addition, in Formula 1, if a relation of a>1 is satisfied, a plurality of $X_1$ may be the same or different. Also, if a relation of 4-a>1 is satisfied in Formula 1, a plurality of $X_2$ may be the same or different.

Particularly, in Formula 1, $X_1$ and $X_2$ may be each independently selected from the group consisting of a hydrogen atom, monovalent $C_{1-20}$ hydrocarbon, $—OR_a$, $—NR_bR_a$, $—SiR_dR_eR_f$ and a covalent bonding functional group. In this case, $R_a$, $R_b$, $R_c$, $R_d$, $R_e$ and $R_f$ may be each independently selected from the group consisting of a hydrogen atom, $C_{1-20}$ alkyl, $C_{3-20}$ cycloalkyl, $C_{6-20}$ aryl, $C_{7-20}$ alkylaryl, $C_{7-20}$ aralkyl, $—SiR'R''R'''$ and a covalent bonding functional group, and R', R'' and R''' may be each independently selected from the group consisting of a hydrogen atom, $C_{1-10}$ alkyl, $C_{3-12}$ cycloalkyl, $C_{6-12}$ aryl, $C_{7-12}$ alkylaryl, $C_{7-12}$ aralkyl, and a covalent bonding functional group, and more particularly, may be $C_{1-8}$ alkyl.

In addition, the hydrocarbon group may be particularly, linear or branched $C_{1-20}$ alkyl such as methyl, ethyl and propyl; $C_{3-20}$ cycloalkyl such as cyclopropyl, cyclobutyl, and cyclopentyl; $C_{6-20}$ aryl such as phenyl; and $C_{7-20}$ aralkyl or $C_{7-20}$ alkylaryl as the combination thereof.

In addition, the covalent bonding functional group may be alkenyl or (meth)acryl, and in this case, the alkenyl may be particularly, $C_{2-20}$ alkenyl, more particularly, $C_{2-12}$ alkenyl, and further more particularly, $C_{2-6}$ alkenyl. More particularly, the covalent bonding functional group may be selected from the group consisting of vinyl, allyl, methallyl, butenyl, pentenyl, hexenyl and (meth)acryl, and the covalent bonding functional group may be allyl in consideration of remarkable improving effect of catalytic activity and polymerization reactivity when applied to a catalyst composition. Meanwhile, in the present invention, (meth)acryl means the inclusion of acryl and methacryl.

Meanwhile, $X_1$ and $X_2$ may be each independently substituted with at least one substituent selected from the group consisting of linear or branched $C_{1-20}$ alkyl, $C_{3-20}$ cycloalkyl, linear or branched $C_{1-20}$ alkoxy, and $C_{6-30}$ aryl.

More particularly, $X_1$ and $X_2$ may be each independently selected from the group consisting of a hydrogen atom, alkyl, alkoxy, vinyl, allyl, methallyl, (meth)acryl, amino ($—NH_2$), alkylamino, allylamino, alkylallylamino, alkylsilylamino, silyl ($—SiH_3$), alkylsilyl, dialkylsilyl, trialkylsilyl, allylsilyl, diallylsilyl, triallylsilyl, alkylallylsilyl, alkyldiallylsilyl, and dialkylallylsilyl, and wherein the alkyl may be linear or branched $C_{1-20}$ alkyl, more particularly, linear or branched $C_{1-6}$ alkyl, and the alkoxy may be linear or branched $C_{1-20}$ alkoxy, more particularly, linear or branched $C_{1-6}$ alkoxy. Here, in Formula 1, at least one of $X_1$ and $X_2$ may be a covalent bonding functional group containing a double bond in a molecule such as vinyl, allyl, methallyl, and (meth)acryl.

More particularly, the functionalizing agent may be selected from the group consisting of the compounds of the following Formulae 2a to 2n:

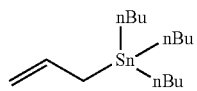
(2a)

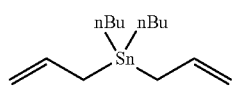
(2b)

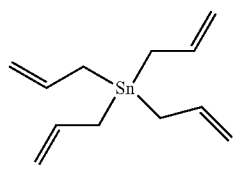
(2c)

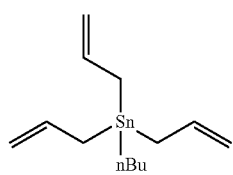
(2d)

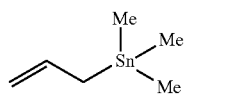
(2e)

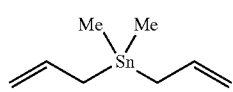
(2f)

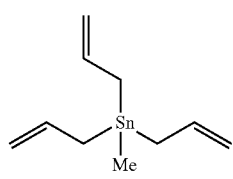
(2g)

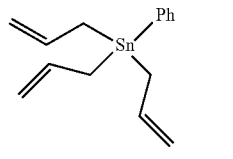
(2h)

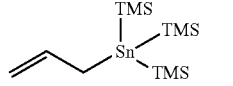
(2i)

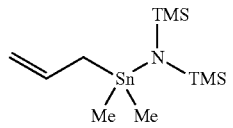
(2j)

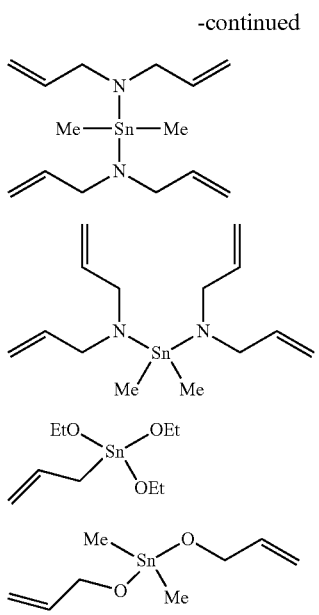

(2k)

(2l)

(2m)

(2n)

In Formulae 2a to 2n, Me means methyl, Ph means phenyl, OEt means ethoxy, and TMS means trimethylsilyl.

The improving effect of processability may be improved with the increase of the number of allyl group in the functionalizing agent. Accordingly, $X_1$ and $X_2$ may be each independently selected from the group consisting of linear or branched $C_{1-6}$ alkyl, vinyl, allyl, and methallyl, where at least one of $X_1$ and $X_2$ may be vinyl, allyl, or methallyl.

The functionalizing agent of Formula 1 may be used by using a common synthesis reaction. In an embodiment, the functionalizing agent of Formula 1 may be prepared by the reaction as in the following Reaction 1. The following Reaction 1 is only an embodiment for explaining the present invention, and the present invention is not limited thereto.

[Reaction 1]

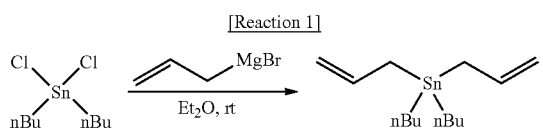

(b) Rare Earth Metal Compound

In the catalyst composition for conjugated diene polymerization according to an embodiment of the present invention, the rare earth metal compound is activated by an alkylating agent and then reaction with a reactive group of the functionalizing agent is performed to form a catalytically active species for the polymerization of a conjugated diene.

As the rare earth metal compound, any one used for the preparation of a common conjugated diene-based polymer may be used, without specific limitation. Particularly, the rare earth metal compound may be a compound including one or at least two of rare earth metals of atomic numbers of 57 to such as lanthanum, neodymium, cerium, gadolinium and praseodymium, and more particularly, a compound including one or at least two selected from the group consisting of neodymium, lanthanum and gadolinium may be used.

In addition, the rare earth metal compound may be rare earth metal-containing carboxylates (for example, neodymium acetate, neodymium acrylate, neodymium methacrylate, neodymium acetate, neodymium gluconate, neodymium citrate, neodymium fumarate, neodymium lactate, neodymium maleate, neodymium oxalate, neodymium 2-ethylhexanoate, neodymium neodecanoate, etc.), organic phosphates (for example, neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, neodymium didecyl phosphate, etc.), organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.), organic phosphinates (for example, neodymium butyl phosphinate, neodymium pentyl phosphinate, neodymium hexyl phosphinate, neodymium heptyl phosphinate, neodymium octyl phosphinate, neodymium (1-methyl heptyl) phosphinate, neodymium (2-ethylhexyl) phosphinate, etc.), carbamates (for example, neodymium dimethyl carbamate, neodymium diethyl carbamate, neodymium diisopropyl carbamate, neodymium dibutyl carbamate, neodymium dibenzyl carbamate, etc.), dithio carbamates (for example, neodymium dimethyldithio carbamate, neodymium diethyldithio carbamate, neodymium diisopropyl dithio carbamate, neodymium dibutyldithio carbamate, etc.), xanthogenates (for example, neodymium methyl xanthogenate, neodymium ethyl xanthogenate, neodymium isopropyl xanthogenate, neodymium butyl xanthogenate, neodymium benzyl xanthogenate, etc.), β-diketonates (for example, neodymium acetylacetonate, neodymium trifluoroacetyl acetonate, neodymium hexafluoroacetyl acetonate, neodymium benzoyl acetonate, etc.), alkoxides or allyloxides (for example, neodymium methoxide, neodymium ethoxide, neodymium isopropoxide, neodymium phenoxide, neodymium nonyl phenoxide, etc.), halides or pseudo halides (neodymium fluoride, neodymium chloride, neodymium bromide, neodymium idodide, neodymium cyanide, neodymium cyanate, neodymium thiocyanate, neodymium azide, etc.), oxyhalides (for example, neodymium oxyfluoride, neodymium oxychloride, neodymium oxybromide, etc.), or organic rare earth metal compounds including at least one rare earth metal-carbon bond (for example, $Cp_3Ln$, $Cp_2LnR$, $Cp_2LnCl$, $CpLnCl_2$, $CpLn$ (cyclooctatetraene), $(C_5Me_5)_2LnR$, $LnR_3$, $Ln(allyl)_3$, $Ln(allyl)_2Cl$, etc., where Ln is a rare earth metal element, and R is hydrocarbyl as defined above), etc. and may include any one or a mixture of at least two thereof.

More particularly, the rare earth metal compound may be a neodymium compound of the following Formula 3:

[Formula 3]

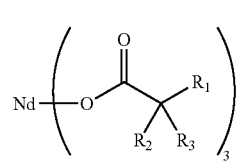

In Formula 3, $R_1$ to $R_3$ are each independently a hydrogen atom, or a linear or branched $C_{1-12}$ alkyl group.

As described above, in the case where the neodymium compound of Formula 3 includes a carboxylate ligand containing an alkyl group having various lengths of at least two carbons at an α position as a substituent, sterical change may be induced around a neodymium central metal to block the tangle between compounds, and as a result, oligomerization is restrained, and a conversion ratio into an active species is high. Such a neodymium compound has a high solubility in a polymerization solvent.

More particularly, the rare earth metal compound may be a neodymium compound of Formula 3, in which $R_1$ is a linear or branched $C_{6-12}$ alkyl group, and $R_2$ and $R_3$ are each independently a hydrogen atom, or a linear or branched $C_{2-6}$ alkyl group, where $R_2$ and $R_3$ are not hydrogen atoms at the same time.

More particularly, in the neodymium compound of Formula 3, $R_1$ may be a linear or branched $C_{6-8}$ alkyl group, and $R_2$ and $R_3$ may be each independently a linear or branched $C_{2-6}$ alkyl group. As described above, when $R_1$ is alkyl having 6 or more carbon atoms, and $R_2$ and $R_3$ are alkyl having 2 or more carbon atoms, the deterioration of conversion efficiency to a catalytically active species may be further improved without fear or oligomerization during a polymerization process, and even better catalyst activity may be attained.

More particularly, the neodymium compound may particularly be at least one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, or a mixture of at least two thereof. In addition, in consideration of excellent solubility in a polymerization solvent without fear of oligomerization, excellent conversion ratio to the catalytically active species and consequent improving effect of catalytic activity, the neodymium compound may be at least one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$, or a mixture of at least two thereof.

In addition, the neodymium compound may have a solubility of about 4 g or more per 6 g a non-polar solvent at room temperature (23±5° C.). In the present invention, the solubility of the neodymium compound means the degree of clear dissolution without generating turbid phenomenon. Through such a high solubility, excellent catalytic activity may be attained.

(c) Alkylating Agent

In the catalyst composition for conjugated diene polymerization according to an embodiment of the present invention, the alkylating agent is an organometallic compound which is capable of delivering a hydrocarbyl group to another metal and plays the role of a co-catalyst. Any alkylating agents used for the preparation of a common diene-based polymer may be used as the alkylating agent, without specific limitation.

Particularly, the alkylating agent is soluble in a non-polar solvent, particularly, a non-polar hydrocarbon-based solvent, and may be an organometallic compound including a bond between a cationic metal such as metals in group 1, 2, or 3 with carbon, or a boron-containing compound. More particularly, the alkylating agent may be at least one selected from the group consisting of an organoaluminum compound, an organomagnesium compound, and an organolithium compound, or a mixture of at least two thereof.

In the alkylating agent, the organoaluminum compound may be, particularly, a compound of the following Formula 4:

$$Al(R)_z(X)_{3-z} \qquad \text{[Formula 4]}$$

In Formula 4,

R is each independently a monovalent organic group which is combined with an aluminum atom via a carbon atom, and may be a hydrocarbyl group such as $C_{1-20}$ alkyl, $C_{3-20}$ cycloalkyl, $C_{2-20}$ alkenyl, $C_{3-20}$ cycloalkenyl, $C_{6-20}$ aryl, $C_{7-20}$ aralkyl, $C_{7-20}$ alkylaryl, allyl, and $C_{2-32}$ alkynyl; or a heterohydrocarbyl group containing at least one heteroatom selected from the group consisting of a nitrogen atom, an oxygen atom, a boron atom, a silicon atom, a sulfur atom, and a phosphor atom in place of carbon in a hydrocarbyl structure, X is each independently selected from the group consisting of a hydrogen atom, a halogen group, a carboxyl group, an alkoxy group and an aryloxy group, z is an integer of 1 to 3.

More particularly, the organoaluminum compound may include dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride, or the like.

In addition, the organoaluminum compound may include aluminoxanes.

The aluminoxane may be prepared by reacting trihydrocarbyl aluminum-based compounds with water, and may particularly be linear aluminoxanes of the following Formula 5a or circular aluminoxanes of the following Formula 5b:

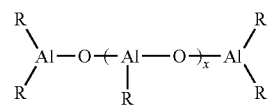

[Formula 5a]

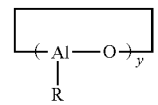

[Formula 5b]

In Formulae 5a and 5b, R is a monovalent organic group which is combined with an aluminum atom via a carbon atom and is the same as the above-defined R, x and y are each independently an integer of 1 or more, particularly, 1 to 100, and more particularly, an integer of 2 to 50.

More particularly, the aluminoxane may be, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of at least two thereof may be used.

In addition, in the aluminoxane compound, the modified methylaluminoxane is obtained by substituting the methyl group of the methylaluminoxane with a modifier (R), particularly, a $C_{2-20}$ hydrocarbon group, and particularly, may be a compound of the following Formula 6:

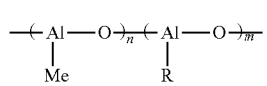

[Formula 6]

In Formula 6, R is the same as defined above, and each of m and n may be an integer of 2 or more. In addition, in Formula 2, Me means a methyl group.

More particularly, R in the above Formula 6 may be linear or branched $C_{2-20}$ alkyl, $C_{3-20}$ cycloalkyl, $C_{2-20}$ alkenyl, $C_{3-20}$ cycloalkenyl, $C_{6-20}$ aryl, $C_{7-20}$ aralkyl, $C_{7-20}$ alkylaryl, allyl, or $C_{2-20}$ alkynyl, and more particularly, may be linear or branched $C_{2-10}$alkyl such as ethyl, isobutyl, hexyl and octyl, and even more particularly, may be isobutyl.

More particularly, the modified methylaluminoxane may be obtained by substituting about 50 mol % to 90 mol % of the methyl group of the methylaluminoxane with the hydrocarbon group. When the amount of the hydrocarbon group substituted in the modified methylaluminoxane is in the range, alkylation may be promoted, and catalytic activity may increase.

Such modified methylaluminoxane may be prepared by a common method, and particularly, may be prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of at least two thereof may be used.

Meanwhile, an organomagnesium compound as the alkylating agent includes at least one magnesium-carbon bond, and may be a magnesium compound dissoluble in a non-polar solvent, specifically, a non-polar hydrocarbon-based solvent. Particularly, the organomagnesium compound may be a compound of the following Formula 7a:

$Mg(R)_2$ [Formula 7a]

In Formula 7a, R is each independently a monovalent organic group and is the same as the above defined R.

More particularly, the organomagnesium compound of Formula 7a may be an alkylmagnesium compound such as diethylmagnesium, di-n-propylmagnesium, diisopropylmagnesium, dibutylmagnesium, dihexylmagnesium, diphenylmagnesium, and dibenzylmagnesium.

In addition, the organomagnesium compound may be a compound of the following Formula 7b:

RMgX [Formula 7b]

In Formula 7b, R is a monovalent organic group and is the same as the above defined R, and X is selected from the group consisting of a hydrogen atom, a halogen group, a carboxyl group, an alkoxy group and an aryloxy group.

More particularly, the organomagnesium compound of Formula 7b may be a hydrocarbyl magnesium hydride such as methyl magnesium hydride, ethyl magnesium hydride, butyl magnesium hydride, hexyl magnesium hydride, phenyl magnesium hydride, and benzyl magnesium hydride; a hydrocarbyl magnesium halide such as methyl magnesium chloride, ethyl magnesium chloride, butyl magnesium chloride, hexyl magnesium chloride, phenyl magnesium chloride, benzyl magnesium chloride, methyl magnesium bromide, ethyl magnesium bromide, butyl magnesium bromide, hexyl magnesium bromide, phenyl magnesium bromide, and benzyl magnesium bromide; a hydrocarbyl magnesium carboxylate such as methyl magnesium hexanoate, ethyl magnesium hexanoate, butyl magnesium hexanoate, hexyl magnesium hexanoate, phenyl magnesium hexanoate, and benzyl magnesium hexanoate; a hydrocarbyl magnesium alkoxide such as methyl magnesium ethoxide, ethyl magnesium ethoxide, butyl magnesium ethoxide, hexyl magnesium ethoxide, phenyl magnesium ethoxide, and benzyl magnesium ethoxide; or a hydrocarbyl magnesium aryloxide such as methyl magnesium phenoxide, ethyl magnesium phenoxide, butyl magnesium phenoxide, hexyl magnesium phenoxide, phenyl magnesium phenoxide, and benzyl magnesium phenoxide.

In addition, as the alkylating agent, an alkyl lithium of R—Li as an organolithium compound (in this case, R is linear or branched $C_{1-20}$ alkyl, and more particularly, linear $C_{1-8}$ alkyl) may be used. More particularly, methyllithium, ethyllithium, isopropyllithium, n-butyllithium, sec-butyllithium, t-butyllithium, isobutyllithium, pentyllithium, isopentyllithium, etc. may be used, and any one or a mixture of at least two thereof may be used.

Among the above compounds, an alkylating agent used in the present invention may be specifically, DIBAH which may play the role of a molecular weight controlling agent during polymerization.

In addition, the alkylating agent may be the modified methylaluminoxane in consideration of improving catalytic activity and reactivity by using aliphatic hydrocarbon-based solvents of a single phase as a solvent system used during preparing a catalyst composition.

(d) Halogen Compound

In the catalyst composition for conjugated diene polymerization according to an embodiment of the present invention, the kind of the halogen compound is not specifically limited, but any halogenating agents used in the preparation of a common diene-based polymer may be used without specific limitation.

Particularly, the halogen compound may be a diatomic halogen, an interhalogen compound, a hydrogen halide, an organic halide, a nonmetal halide, a metal halide, or an organometallic halide, etc., and any one or a mixture of at least two thereof may be used. Among them, in consideration of the improvement of catalytic activity and consequent improving effect of reactivity, the halogen compound may be one selected from the group consisting of an organic halide, a metal halide and an organometallic halide, or a mixture of at least two thereof.

More particularly, the diatomic halogen may include fluorine, chlorine, bromine, or iodine.

The interhalogen compound may particularly include iodine monochloride, iodine monobromide, iodine trichloride, iodine pentafluoride, iodine monofluoride, iodine trifluoride, etc.

In addition, the hydrogen halide may particularly include hydrogen fluoride, hydrogen chloride, hydrogen bromide, or hydrogen iodide.

In addition, the organic halide may particularly include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may particularly include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorus triiodide, phosphorus oxyiodide or selenium tetraiodide.

The metal halide may particularly include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

The organometallic halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition for preparing a conjugated diene polymer according to an embodiment of the present invention may include a non-coordinating anion-containing compound or a non-coordinating anion precursor compound together with the halogen compound instead of the halogen compound.

Particularly, in the non-coordinating anion-containing compound, the non-coordinating anions may be anions not forming a coordination bond with the active center of a catalyst system due to steric hindrance and having a sterically large volume, and may be tetraarylborate anions or tetraarylborate fluoride anions. In addition, the non-coordinating anion-containing compound may include carbonium cations such as triaryl carbonium cations; ammonium cations such as N,N-dialkyl anilinium cations, or counter cations such as phosphonium cations together with the non-coordinating anions. More particularly, the non-coordinating anion-containing compound may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, N,N-dimethylanilinium tetrakis[3,5-bis(trifluoromethyl)phenyl]borate, or the like.

In addition, as the non-coordinating anion precursor, a triaryl boron compound ($BR_3$, where R is a strongly electron withdrawing aryl group such as a pentafluorophenyl group and a 3,5-bis(trifluoromethyl)phenyl group) may be used as a compound capable of forming non-coordinating anions under reaction conditions.

The catalyst composition for forming a conjugated diene-based polymer according to an embodiment of the present invention may further include a diene-based monomer in addition to the above-described components.

The diene-based monomer may be mixed with a catalyst for polymerization and form a premixing type catalyst, or may be polymerized with components in a catalyst for polymerization, specifically an alkylating agent such as DIBAH to form a preforming type catalyst. In case of conducting such preforming polymerization, catalytic activity may be improved, and a conjugated diene-based polymer thus prepared may be further stabilized.

Particularly, as the diene-based monomer, any one used for the preparation of a common conjugated diene-based polymer may be used, without specific limitation.

Particularly, the diene-based monomer may be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, or the like, and any one or a mixture of at least two thereof may be used.

The catalyst composition for forming a conjugated diene-based polymer according to an embodiment of the present invention may further include a reaction solvent in addition to the above-described components.

The reaction solvent may particularly be a non-polar solvent having no reactivity with the components constituting the catalyst. Particularly, linear, branched or circular aliphatic $C_{5-20}$ hydrocarbon such as n-pentane, n-hexane, n-heptane, n-octane, n-nonane, n-decane, isopentane, isohexane, isopentane, isooctane, 2,2-dimethylbutane, cyclopentane, cyclohexane, methylcyclopentane and methylcyclohexane; a mixture solvent of aliphatic $C_{5-20}$ hydrocarbon such as petroleum ether, petroleum spirits, and kerosene; or an aromatic hydrocarbon-based solvent such as benzene, toluene, ethylbenzene, and xylene, and any one or a mixture of at least two thereof may be used. More particularly, the non-polar solvent may be linear, branched or circular aliphatic $C_{5-20}$ hydrocarbon or a mixture solvent of aliphatic hydrocarbon, and more particularly, n-hexane, cyclohexane, or a mixture thereof may be used.

In addition, the reaction solvent may be appropriately selected according to the kind of the materials constituting the catalyst composition, specifically, the alkylating agent.

In particular, an alkylaluminoxane such as methylaluminoxane (MAO) and ethylaluminoxane as the alkylating agent is not easily dissolved in an aliphatic hydrocarbon-based solvent, and an aromatic hydrocarbon-based solvent may be appropriately used.

In addition, in the case where modified methylaluminoxane is used as the alkylating agent, an aliphatic hydrocarbon-based solvent may be appropriately used. In this case, a single solvent system may be attained together with an aliphatic hydrocarbon-based solvent such as hexane, which is mainly used as a polymerization solvent, the polymerization reaction may be more favorable. In addition, the aliphatic hydrocarbon-based solvent may promote catalytic activity, and reactivity may be further improved due to such catalytic activity.

The above-described constituting components in the catalyst composition may form a catalytically active species via the interaction therebetween. Accordingly, the catalyst composition according to an embodiment of the present invention may include by optimally combining the amounts of the constituting components so as to show even better catalytic activity and excellent polymerization reactivity.

Particularly, the catalyst composition may include 20 equivalents or less, and more particularly 0.0001 equivalents to 20 equivalents of the functionalizing agent based on 1 equivalent of the rare earth metal compound. If the amount of the functionalizing agent is greater than 20 equivalents, unreacted functionalizing agent may remain to induce side reactions. More particularly, the functionalizing agent may be included in an amount of 1 equivalent to 10 equivalents based on 1 equivalent of the rare earth metal compound.

In addition, the catalyst composition includes the alkylating agent in an amount of 5 moles to 200 moles based on 1 mole of the rare earth metal compound. If the amount of the alkylating agent is less than 5 molar ratio, activation effect with respect to the rare earth metal compound may be insignificant, and if the amount is greater than 200 molar ratio, the control of catalyst reaction during preparing a polymer is not easy, and it is apprehended that an excessive amount of the alkylating agent may induce side reactions. More particularly, the catalyst composition may include the alkylating agent in an amount of 5 moles to 20 moles based on 1 mole of the rare earth metal compound, and may include 5 moles to 10 moles in consideration of the remarkable improving effect of processability.

In addition, the catalyst composition may include 1 mole to 20 moles, and may more particularly include 2 moles to 6 moles of the halogen compound based on 1 mole of the rare earth metal compound. If the amount of the halogen compound is less than 1 molar ratio, the generation of a catalytically active species is insufficient, and catalytic activity may be deteriorated. If the amount is greater than 20 molar ratio, the control of catalyst reaction is not easy, and the excessive amount of the halogen compound may induce side reactions.

In addition, if the catalyst composition further includes the diene-based monomer, the catalyst composition may particularly further include 1 equivalent to 100 equivalents, and more particularly, 20 equivalents to 50 equivalents of the diene-based monomer based on 1 equivalent of the rare earth metal compound.

In addition, if the catalyst composition further includes the reaction solvent, the catalyst composition may further include the reaction solvent in an amount of 20 moles to 20,000 moles, and more particularly, 100 moles to 1,000 moles based on 1 mole of the rare earth metal compound.

The catalyst composition having the above-described constitution may be prepared by mixing the functionalizing agent, the rare earth metal compound, the alkylating agent, the halogen compound, and selectively the conjugated diene monomer and the reaction solvent by a common method.

In an embodiment, a premixing type catalyst composition may be prepared by adding a functionalizing agent, a rare earth metal compound, an alkylating agent, a halogen compound and selectively a conjugated diene monomer to a reaction solvent one by one or simultaneously, and then, mixing.

In an another embodiment, a preforming type catalyst composition may be prepared by mixing a functionalizing agent, a rare earth metal compound, an alkylating agent and a halogen compound to a reaction solvent, adding a conjugated diene monomer, and preforming.

In this case, to promote the generation of a catalytically active species, the mixing and polymerizing processes may be conducted in a temperature range of 0° C. to 60° C., and in this case, heat treatment may be conducted simultaneously to fulfill the temperature conditions.

More particularly, the catalyst composition may be prepared by mixing a rare earth metal compound, an alkylating agent, a reaction solvent and selectively a conjugated diene monomer, first heat treating at a temperature of 10° C. to 60° C., adding a halogen compound to the mixture thus obtained, and second heat treating in a temperature range of 0° C. to 60° C.

In the catalyst composition prepared by the above-described preparation method, a catalytically active species is formed by the interaction of constituting components.

As described above, due to the use of the functionalizing agent, the catalyst composition of the present invention may produce a catalytically active species having better catalytic activity and polymerization reactivity when compared to the conventional composition. As a result, a conjugated diene-based polymer having even higher linearity and processability may be prepared.

In particular, the catalyst composition having the above-described components may show the degree of a catalytic activity of 10,000 kg [polymer]/mol[Nd]·h or more during the polymerization in a temperature range of 20° C. to 90° C. for 5 minutes to 60 minutes. In the present invention, the degree of catalytic activity is a value obtained from the injection molar ratio of the rare earth metal compound with respect to the total amount obtained of the conjugated diene-based polymer thus prepared.

Conjugated Diene Polymer

According to another embodiment of the present invention, a conjugated diene-based polymer prepared using the catalyst composition, and a method of preparing the same are provided.

The conjugated diene-based polymer according to an embodiment of the present invention may be prepared by the polymerization reaction of a conjugated diene-based monomer according to a typical preparation method of a conjugated diene-based polymer except for using the catalyst composition for conjugated diene polymerization.

In this case, the polymerization reaction may be conducted by various polymerization methods such as a bulk polymerization, a solution polymerization, a suspension polymerization and an emulsion polymerization, and may be also conducted by a batch method, a continuous method and a semi-continuous method. More particularly, a method may be appropriately selected and conducted among the polymerization methods according to the kind of the functionalizing agent used in the catalyst composition. In an embodiment, in the case where the functionalizing agent included in the catalyst composition is a Sn-based compound, an Andrew bottle type polymerization method may be used.

Particularly, in the case where the solution polymerization is used for the preparation, the conjugated diene polymer according to an embodiment of the present invention may be prepared by injecting a diene-based monomer to the catalyst composition for polymerization, and performing reaction.

As the conjugated diene-based monomer, any one used for preparing a common conjugated diene-based polymer may be used, without specific limitation. The diene-based monomer may particularly be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, etc., and any one or a mixture of at least two thereof may be used. More particularly, the diene-based monomer may be 1,3-butadiene.

In addition, other monomers capable of being copolymerized with the diene monomer may be further used during the polymerization reaction in consideration of the physical properties of the diene polymer finally prepared.

The other monomers may particularly include an aromatic vinyl monomer such as styrene, p-methylstyrene, α-methylstyrene, 1-vinylnaphthalene, 3-vinyltoluene, ethylvinylbenzene, divinylbenzene, 4-cyclohexylstyrene, and 2,4,6-trimethylstyrene, and any one or a mixture of at least two thereof may be used. The other monomers may be used in an amount of 20 wt % or less based on the total amount of the monomers used in the polymerization reaction.

In this case, the diene-based monomer is used not such that the total amount used for the preparation of a conjugated diene-based polymer is dissolved in a non-polar solvent, but such that a portion of the total amount is dissolved in a polymerization solvent and polymerized, and then injected in installments according to the polymerization conversion ratio in once or more times, particularly, in twice or more times, and more particularly, in twice to four times.

In addition, the polymerization solvent may be a non-polar solvent, and this solvent is the same as the solvent used in advance for the preparation of a catalyst for polymerization.

The concentration of a monomer used in the polymerization solvent is not specifically limited, and may be 3 wt % to 80 wt %, and more particularly, 10 wt % to 30 wt %.

In addition, during the polymerization reaction, additives may be further used, including a molecular weight controlling agent such as trimethylaluminum, diisobutylaluminum hydride, and trimethylsilane; a reaction terminator such as polyoxyethylene glycol phosphate; and an antioxidant such as 2,6-di-t-butylparacresol. In addition, additives serving easy solution polymerization, particularly, additives such as a chelating agent, a dispersant, a pH controlling agent, a deoxidant, and an oxygen scavenger may be selectively used.

In addition, the polymerization reaction may be conducted at a temperature of 0° C. to 200° C., and more particularly, 20° C. to 100° C.

In addition, the polymerization reaction may be performed in the above temperature range until a conversion ratio of a conjugated diene-based polymer reaches 100%, for 5 minutes to 1 hour, particularly, for 10 minutes to 2 hours.

From the result of the polymerization reaction, a conjugated diene-based polymer is produced.

The conjugated diene-based polymer may be a rare earth metal catalyzed conjugated diene-based polymer containing an active organometallic part, which is derived from a catalyst including the rare earth metal compound, more particularly, a rare earth metal catalyzed butadiene-based polymer containing a 1,3-butadiene monomer unit, and more particularly, a neodymium catalyzed butadiene-based polymer containing a 1,3-butadiene monomer unit. In addition, the conjugated diene-based polymer may be a polybutadiene composed of only 1,3-butadiene monomers.

The conjugated diene-based polymer produced by the polymerization reaction may be dissolved in a polymerization solvent, or may be obtained in a precipitated state. If the polymer is dissolved in the polymerization solvent, precipitation may be obtained by adding a lower alcohol such as methyl alcohol or ethyl alcohol, or steam. Thus, the method of preparing a conjugated diene-based polymer according to an embodiment of the present invention may further include precipitation and separation processes with respect to a conjugated diene-based polymer prepared after the polymerization reaction. In this case, filtering, separating and drying processes with respect to the precipitated conjugated diene-based polymer may be conducted by a common method.

As described above, in the method of preparing a conjugated diene-based polymer according to an embodiment of the present invention, a conjugated diene-based polymer having high linearity and processability may be prepared by using a functionalizing agent during preparing a catalyst composition.

Particularly, the conjugated diene-based polymer may include a functional group derived from the functionalzing agent in a molecule.

In addition, the conjugated diene-based polymer may be a rare earth metal catalyzed diene-based polymer containing an active organometallic part, which is derived from a catalyst including the rare earth metal compound, more particularly, a rare earth metal catalyzed butadiene-based polymer containing a 1,3-butadiene monomer unit, and more particularly, a neodymium catalyzed butadiene-based polymer.

The conjugated diene-based polymer according to an embodiment of the present invention may have narrow distribution of molecular weight, i.e., have a polydispersity (PDI) of 3.4 or less, which is a ratio (Mw/Mn) of a weight average molecular weight (Mw) and a number average molecular weight (Mn). If the PDI of the conjugated diene-based polymer is greater than 3.4, and the polymer is applied in a rubber composition, mechanical properties such as abrasion resistance and impact resistance may be deteriorated. More particularly, the polydispersity of the conjugated diene-based polymer may be 3.2 or less in consideration of remarkable improving effect of the mechanical properties of the polymer according to the control of polydispersity.

The conjugated diene-based polymer according to an embodiment of the present invention may have a weight average molecular weight (Mw) of 300,000 g/mol to 1,200,000 g/mol, and particularly 400,000 g/mol to 1,000,000 g/mol. In addition, the conjugated diene-based polymer according to an embodiment of the present invention may have a number average molecular weight (Mn) of 100,000 g/mol to 700,000 g/mol, and particularly 120,000 g/mol to 500,000 g/mol.

If the conjugated diene-based polymer has a weight average molecular weight of less than 300,000 g/mol and a number average molecular weight of less than 100,000 g/mol, the elasticity of a vulcanizate may decrease, hysteresis loss may increase, and abrasion resistance may be degenerated. If the weight average molecular weight is greater than 1,200,000 g/mol or the number average molecular weight is greater than 700,000 g/mol, processability may be deteriorated, the workability of a rubber composition including the conjugated diene-based polymer may be degenerated, and mixing and kneading may become difficult, and thus, the sufficient improvement of the physical properties of a rubber composition may become difficult. In the present invention, each of the weight average molecular weight and the number average molecular weight is conversion molecular weight with a polystyrene standard, which is analyzed by gel permeation type chromatography (GPC).

More particularly, when applied in a rubber composition and in consideration of improving effect of the mechanical properties, elasticity and processability of the rubber composition in balance, the conjugated diene-based polymer according to an embodiment of the present invention may preferably satisfy the polydispersity, the weight average molecular weight and the number average molecular weight conditions at the same time. Particularly, the conjugated diene-based polymer has a ratio (Mw/Mn) of a weight average molecular weight (Mw) and a number average molecular weight (Mn) of 3.4 or less, a weight average molecular weight (Mw) of 300,000 g/mol to 1,200,000 g/mol, and a number average molecular weight (Mn) of 100,000 g/mol to 700,000 g/mol, and more particularly, a ratio (Mw/Mn) of a weight average molecular weight (Mw) and a number average molecular weight (Mn) of 3.2 or less, a weight average molecular weight (Mw) of 400,000 g/mol to 1,000,000 g/mol, and a number average molecular weight (Mn) of 120,000 g/mol to 500,000 g/mol.

In addition, the conjugated diene-based polymer shows high linearity due to the use of a functionalizing agent during the preparation process thereof. Generally, with the increase of linearity, a branching degree may decrease, and a solution viscosity may increase. Particularly, when solution viscosity (SV) is divided by mooney viscosity (MV) to obtain a value and the corrected value thereof is referred to as linearity (SV/MV), the linearity (SV/MV) of the conjugated diene-based polymer according to an embodiment of the present invention may be 1 to 15, and more particularly 3.5 to 13.

In addition, the mooney viscosity (ML1+4) of the conjugated diene-based polymer at 100° C. may be 10 MU to 90 MU, and particularly, 20 MU to 80 MU. In addition, the solution viscosity of the conjugated diene-based polymer may be 100 cP to 600 cP, and particularly, 120 cP to 500 cP.

In the present invention, the mooney viscosity may be measured, for example, by using MV2000E manufactured by Monsanto Co., Ltd. using Large Rotor at 100° C. at a rotor speed of 2±0.02 rpm. In this case, a specimen used may be stood at room temperature (23±3° C.) for 30 minutes or more, and 27±3 g of the specimen may be collected and put in a die cavity, and then, the mooney viscosity may be measured by operating Platen. The unit of the mooney viscosity is a mooney unit (MU). In the present invention, the solution viscosity (SV) was measured by the same method for measuring the mooney viscosity, but the viscosity of a polymer in 5% toluene at 20° C. was measured.

More particularly, in consideration of remarkable improving effect according to the control of the mooney viscosity and the solution viscosity, the conjugated diene-based polymer according to an embodiment of the present invention may have a mooney viscosity (MV) at 100° C. of 20 MU to 80 MU, a solution viscosity (SV) of 100 cP to 600 cP, and a linearity (SV/MV) of 3 to 13.

In addition, the conjugated diene-based polymer according to an embodiment of the present invention may have the cis content in the conjugated diene-based polymer, when measured by Fourier transform infrared spectroscopy, particularly, the cis-1,4 bond content of 95% or more, and more particularly, 96% or more. In addition, the vinyl bond content in the conjugated diene-based polymer may be 1% or less. When the cis-1,4 bond content in a polymer is high as described above, linearity may increase, and when mixed in a rubber composition, the abrasion resistance and cracking resistance of the rubber composition may be improved.

In addition, the conjugated diene-based polymer according to an embodiment of the present invention has pseudo-living properties. Accordingly, a polymer may be modified via the modification process of the terminal thereof for functionalizing using a functional group such as a group having an interaction with an inorganic filler such as carbon black and silica. In this case, the method of preparing a conjugated diene-based polymer according to an embodiment of the present invention may further include a modification process using a modifier with respect to the conjugated diene-based polymer prepared as the result of a polymerization reaction.

The modification process may be conducted by a common modification method except for using the conjugated diene-based polymer according to the present invention.

In addition, as the modifier, a compound which may impart a polymer with the functional group or increase a molecular weight via coupling during the reaction with a conjugated diene-based polymer, may be used. Particularly, at least one functional group selected from an azacyclopropane group, a ketone group, a carboxyl group, a thiocarboxyl group, a carbonate group, a carboxylic anhydride group, a metal carboxylate, an acid halide, an urea group, a thiourea group, an amide group, a thioamide group, an isocyanate group, a thioisocyanate group, a halo-isocyano group, an epoxy group, a thioepoxy group, an imine group and an M-Z bond (where M is selected from the group consisting of Sn, Si, Ge and P, and Z is a halogen atom) may be included, and an activated proton and an onium salt, which activate the active organometallic part, may not be included. More particularly, the terminal modifier may be one selected from the group consisting of alkoxysilane, an imine-containing compound, an ester, an ester-carboxylate metal complex, an alkyl ester carboxylate metal complex, an aldehyde or ketone, an amide, an isocyanate, an isothiocyanate, an imine and an epoxide, or a mixture of at least two thereof. In an embodiment, the modifier may be (E)-N,N-dimethyl-4-((undecylimino)methyl)benzenamine. The terminal modifier during a modification process may be used in an amount of 0.01 equivalents to 200 equivalents, and more particularly, 0.1 equivalents to 150 equivalents based on 1 equivalent of the rare earth metal compound.

The conjugated diene-based polymer prepared via the modification process includes a modifier derived functional group in the polymer, particularly, at the terminal thereof. Particularly, the modifier derived functional group may be at least one selected from an azacyclopropane group, a ketone group, a carboxyl group, a thiocarboxyl group, a carbonate group, a carboxylic anhydride group, a metal carboxylate, an acid halide, an urea group, a thiourea group, an amide group, a thioamide group, an isocyanate group, a thioisocyanate group, a halo-isocyano group, an epoxy group, a thioepoxy group, an imine group and an M-Z bond (where M is selected from the group consisting of Sn, Si, Ge and P, and Z is a halogen atom). By including such a modifier derived functional group, good affinity with respect to an inorganic filler such as carbon black and silica, which are used during preparing a rubber composition, may be shown, and the dispersibility thereof may be increased. As a result, the physical properties of a rubber composition may be further improved. Therefore, according to another embodiment of the present invention, a modified and conjugated diene-based polymer is provided.

Rubber Composition

According to further another embodiment of the present invention, a rubber composition including the conjugated diene-based polymer is provided.

Particularly, the rubber composition may include 10 wt % to 100 wt % of the conjugated diene-based polymer and less than 90 wt % of a rubber component. If the amount of the conjugated diene-based polymer is less than 10 wt %, the improving effect of the abrasion resistance, crack resistance, and ozone resistance of the rubber composition may be insignificant.

In addition, the rubber component may particularly be natural rubber (NR); or synthetic rubber such as a styrene-butadiene copolymer (SBR), a hydrogenated SBR, a polybutadiene (BR) having a low cis-1,4 bond content, a hydrogenated BR, a polyisoprene (IR), butyl rubber (IIR), ethylene propylene rubber, ethylene propylene diene rubber, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicone rubber, and epichlorohydrin rubber, and any one or a mixture of at least two thereof may be used.

In addition, the rubber composition may further include 10 parts by weight or more of a filler based on 100 parts by weight of the rubber component. In this case, the filler may be carbon black, starch, silica, aluminum hydroxide, magnesium hydroxide, clay (hydrated aluminum silicate), etc., and any one or a mixture of at least two thereof may be used.

In addition, to the rubber composition, a compounding agent used in a common rubber industry such as a vulcanizing agent, a vulcanization accelerator, an antiaging agent, a scorch preventing agent, a softening agent, a zinc white, stearic acid and a silane coupling agent may be appropriately selected and mixed in addition to the rubber component and filler in a range of not hindering the object of the present invention.

The rubber composition is prepared by using a catalyst composition including a functionalizing agent, and includes a conjugated diene-based polymer having excellent linearity and processability, thereby exhibiting improved effects of abrasion, viscoelasticity and processability in balance without leaning to one side.

Accordingly, the rubber composition is useful for the manufacture of various rubber molded articles such as tires for a car, a truck (track) and a bus (for example, a tire tread, a side-wheel, a sub-tread, a bead filler, a breaking member, etc.), elastic parts of a tire stock, an O-ring, a profile, a gasket, a film, a hose, a belt, the sole of shoes, dustproof rubber and a window seal.

Hereinafter, the present invention will be explained in particular referring to embodiments. However, it will be understood that the embodiments of the present invention may have various modifications, and the scope of the present invention should be interpreted to be limited to the following embodiments. The embodiments of the present invention are provided to more completely explaining the present invention to a person having an average knowledge in the art.

[Preparation of Functionalizing Agent]

Preparation Example 1: Preparation of Allyltributylstannane

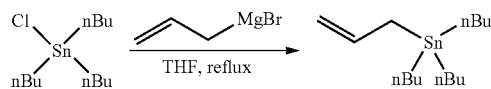

To a solution prepared by dissolving nBu$_3$SnCl (35 g, 30 ml, 110 mmol) in THF at 0° C., a solution of allylmagnesium bromide (allylMgBr) (65 ml, 129 mmol, 2.0 M in THF) was slowly added. The reaction mixture was stirred at room temperature (23±5° C.) for 2 hours and then, refluxed overnight for 12 hours. The resultant solution thus obtained was quenched using ice water and extracted with diethyl ether (Et$_2$O). An ether solution thus obtained was dried with MgSO$_4$, and volatile solvents were removed under a reduced pressure. The residual product was separated via silica gel neutralized with Et$_3$N, and an eluent of Et$_2$O:Hx (mixture volume ratio=1:20 to 1:10) to obtain allyltributylstannane as a functionalizing agent.

$^1$H NMR (500 MHz, CDCl$_3$) 5.98-5.88 (m, 1H), 4.88 (d, J=16.8 Hz, 1H), 4.64 (d, J=9.9 Hz, 1H), 1.78 (dt, J=8.6, 30.2 Hz, 2H), 1.53-1.44 (m, 8H), 1.34-1.26 (m, 8H), 0.94-0.80 (m, 18H).

Preparation Example 2: Preparation of Diallyldibutylstannane

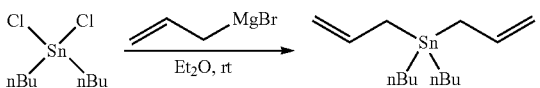

To a solution prepared by dissolving nBu$_2$SnCl$_2$ (3 g, 9.87 mmol) in Et$_2$O at room temperature (23±5° C.), a solution of allylMgBr (1.0 M, 30 mmol, 30 ml in Et$_2$O) was added dropwisely. The reaction mixture was stirred at room temperature for 2 hours. After finishing the reaction, the solution thus obtained was quenched using NaCl and extracted with diethyl ether (Et$_2$O). An organic layer thus separated was extracted with Et$_2$O and dried with MgSO$_4$. Under a reduced pressure, volatile solvents were removed, and the residual product was separated via silica gel neutralized with Et$_3$N and Et$_2$O to obtain diallyldibutylstannane of colorless oil as a functionalizing agent (3.07 g, 99% yield).

$^1$H NMR (500 MHz, CDCl$_3$) 5.96-5.89 (2H, m), 4.81 (2H, d, J=20 Hz), 4.68 (2H, d, J=10 Hz), 1.89-1.80 (8H, m), 1.54-1.28 (13H, m), 0.95-0.89 (12H, m).

Preparation Example 3: Preparation of Triallylbutylstannane

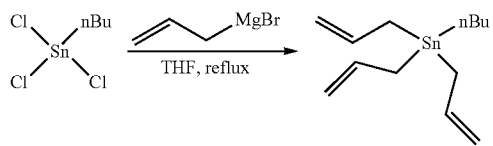

A THF solution of allylMgBr was prepared by reacting Mg (16 g, 693 mmol) and allyl bromide (allylBr) (52 ml, 600 mmol) in THF (500 ml). After stirring the reaction solution overnight, a THF solution of nBuSnCl$_3$ (51.3 g, 182 mmol) was added dropwisely to the THF solution of allylMgBr for 2 hours. The reaction mixture was stirred at room temperature for 0.5 hours, and refluxed overnight for 12 hours. The resultant solution thus obtained was cooled to room temperature, poured into ice water, extracted with diethyl ether (Et$_2$O), and dried with Na$_2$SO$_4$. An organic layer was removed under a reduced pressure, and the resultant residual product was separated via silica gel neutralized with Et$_3$N, and an eluent of Et$_2$O:n-hexane (Hx) (mixture volume ratio=1:10) to obtain triallylbutylstannane as a functionalizing agent (3.07 g, 99% yield).

$^1$H NMR (500 MHz, CDCl$_3$) 5.97-5.88 (m, 3H), 4.84 (dd, J=11.1, 27.9 Hz, 3H), 4.71 (dd, J=10.3, 20.4 Hz, 3H), 1.88 (dt, J=8.55, 31.1 Hz, 3H), 1.58-1.43 (m, 1H), 1.34-1.27 (m, 1H), 1.06-1.02 (m, 1H), 0.90 (t, J=7.3 Hz, 2H).

Preparation Example 4: Preparation of Tetraallylstannane

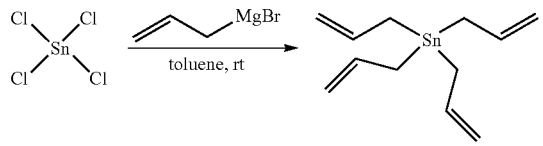

At room temperature(23±5° C.), a solution of allylmagnesium bromide (2.0 M, 48.4 mmol, 24.2 ml in THF) was added to a solution obtained by dissolving SnCl$_4$ (3 g, 11.55 mmol) in toluene (30 ml). A reaction mixture was stirred at room temperature for 2 hours and refluxed overnight for 12 hours. After finishing the reaction, the reaction product was cooled to room temperature, poured into ice water and extracted with diethyl ether (Et$_2$O). A combined ethereal extract was washed with water, dried with anhydrous Na$_2$SO$_4$, and concentrated under a reduced pressure. The residual product was filtered using silica gel and a hexane eluent to obtain tetraallylstannane of colorless oil.

$^1$H NMR (500 MHz, CDCl$_3$) 5.97-5.89 (m, 4H), 4.90 (dd, J=5.0, 25.0 Hz 4H), 4.76 (dd, J=10.0, 25.0 Hz, 4H), 1.91 (td, J=30, 20 Hz, 8H).

Preparation Example 5: Preparation of Triallylphenylstannane

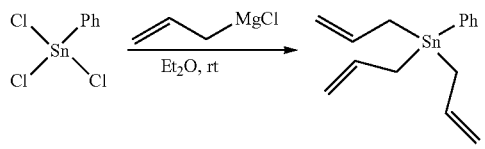

To a solution prepared by dissolving PhSnCl$_3$ (3 g, 9.93 mmol) in Et$_2$O at 0° C., an alllylMgCl solution (16.4 ml, 32.8 mmol, 2.0 M in THF) was added. The reaction mixture was stirred at room temperature overnight for 12 hours. After finishing the reaction, the resultant solution thus obtained was poured into ice water, extracted with Et$_2$O, and dried with Na$_2$SO$_4$. An ether solution was evaporated under a reduced pressure, and the residual product was separated by silica gel chromatography using an eluent of Et$_2$O:Hx (mixture volume ratio=1:10) to obtain triallylphenylstannane as a functionalizing agent.

$^1$H NMR (500 MHz, CDCl$_3$) 7.42-7.26 (m, 5H), 5.95-5.81 (m, 3H), 4.83 (dd, J=11.8, 28.5 Hz, 3H), 4.70 (dd, J=12.6, 22.8 Hz, 3H), 2.02 (dt, J=8.5, 33.2 Hz, 6H).

[Preparation of Conjugated Diene-Based Polymer]

Example 1

A neodymium compound of Nd(2,2-diethyl decanoate)$_3$ (concentration in hexane=40 wt %) and the functionalizing agent (i) (DAT, 5 equivalents based on 1 equivalent of the neodymium compound), which was prepared in Preparation Example 2 and had the following structure, were injected to a hexane solvent. Then, diisobutylaluminum hydride (DIBAH) and diethylaluminum chloride (DEAC) were added one by one such that a molar ratio of neodymium compound:DIBAH:DEAC=1:10:2.4 and mixed to prepare a catalyst composition.

To a completely dried organic reactor, a vacuum state and a nitrogen gas were alternately applied, and to a reactor in a vacuum state, 4.7 kg of a mixture solution of 1,3-butadiene/hexane (1,3-butadiene content=500 g) was added, the catalyst composition prepared above was added, and a polymerization reaction was performed at 70° C. for 60 minutes to prepare a butadiene polymer.

(i)

Example 2

A butadiene polymer was prepared by conducting the same method described in Example 1 except for using the functionalizing agent (ii) (TAT) (5 equivalents based on 1 equivalent of the neodymium compound) of the following chemical formula, which was prepared in Preparation Example 4 as the functionalizing agent in Example 1.

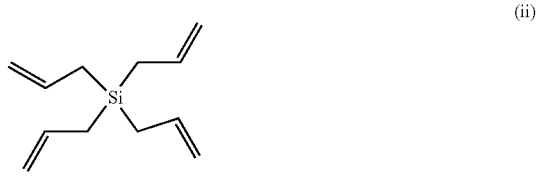

(ii)

Example 3

To a mixture solution of hexane and 1,3-butadiene (pBD), a neodymium compound of Nd(2,2-diethyl decanoate)$_3$ (concentration in hexane=40 wt %), the functionalizing agent (i) (1 equivalent based on 1 equivalent of the neodymium compound), diisobutylaluminum hydride (DIBAH), and diethylaluminum chloride (DEAC) were injected one by one such that a molar ratio of neodymium compound:DIBAH:DEAC=1:9.2:2.4, and mixed to prepare a catalyst composition. In this case, equivalents of the 1,3-butadiene was used based on 1 equivalent of the neodymium compound.

A butadiene polymer was prepared by conducting the same method described in Example 1 except for using the catalyst composition thus prepared.

Comparative Example 1

A neodymium compound of Nd(2,2-diethyl decanoate)$_3$, diisobutylaluminum hydride (DIBAH), and diethylaluminum chloride (DEAC) were injected to a hexane solvent one by one such that the molar ratio of neodymium compound:DIBAH:DEAC=1:10.1:2.4, and mixed to prepare a catalyst for polymerization.

A butadiene polymer was prepared by conducting the same method described in Example 1 except for using the catalyst for polymerization thus prepared.

Comparative Example 2

A butadiene polymer (BR1208™, manufactured by LG Chemicals Co., Ltd.) prepared by conducting the same method described in Example 1 except for using nickel octoate instead of a Nd-based catalyst and not using a functionalizing agent in Example 1, was used.

Experimental Example 1

The improvement of catalytic activity and the improving effect of conversion ratio according to the use of the functionalizing agent of the present invention when using a butadiene-based polymer, were evaluated.

In detail, 89 mg (0.054 mmol) of a neodymium compound of Nd(2,2-diethyl decanoate)$_3$, a functionalizing agent described in the following Table 1 (amount used: amount described in Table 1 based on 1 equivalent of the neodymium compound), diisobutylaluminum hydride (DIBAH) (0.12 ml, 0.675 mmol), and diethylaluminum chloride (DEAC) (0.13 ml, 0.130 mmol) were added one by one to hexane, and mixed to prepare a catalyst composition. To a completely dried organic reactor, a vacuum state and a nitrogen gas were alternately applied, and to a reactor in a vacuum state, 150 g of a mixture solution of 1,3-butadiene/hexane (1,3-butadiene content=22.5 g) was added, and the prepared catalyst composition was added thereto, and then, a polymerization reaction was performed at 70° C. for the time period described in the following Table 1 to prepare a butadiene polymer.

TABLE 1

| | Functionalizing agent | | Polymerization | Conversion |
|---|---|---|---|---|
| | Kind | Amount | time | ratio |
| Example 4 | 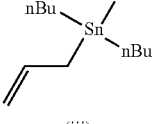 (iii) | 5 eq | 30 min | 100% |
| Example 5 | 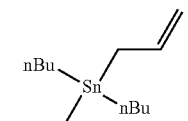 (i) | 5 eq | 30 min | 91% |
| Example 6 | 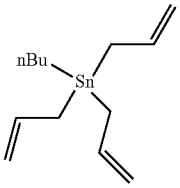 (iv) | 5 eq | 30 min | 95% |
| Example 7 | 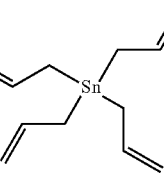 (ii) | 5 eq | 30 min | 98% |

TABLE 1-continued

| | Functionalizing agent | | Polymerization time | Conversion ratio |
|---|---|---|---|---|
| | Kind | Amount | | |
| Example 8 | (v) allyl-Sn(Ph)(allyl)(allyl) | 5 eq | 30 min | 49% |
| Example 9 | | | 50 min | 59% |
| Example 10 | | | 90 min | 65% |
| Example 11 | (vi) EtO-Sn(OEt)(OEt)(allyl) | 5 eq | 30 min | 10% |
| Example 12 | (vii) Me-Sn(O-allyl)(O-allyl)(Me) | 5 eq | 30 min | 25% |

From the experimental results, the conversion to a butadiene polymer became possible due to the use of the functionalizing agent according to the present invention, and conversion ratio to a butadiene polymer was increased with longer polymerization time. In addition, when the reaction was conducted with the same amount for the same polymerization time, a case where all functional groups bonded to Sn were polymerization reactive functional groups, or a case where using a functionalizing agent including at least one polymerization reactive functional group with alkyl (Examples 4 to 7) showed higher conversion ratio than cases where using functionalizing agents having aryl or alkoxy (Examples 8 to 11). In addition, similarly, a case where using a functionalizing agent including allyl as a polymerization reactive functional group even though including alkyl (Example 5) showed higher conversion ratio when compared to a case where using a functionalizing agent including allyl bonded via oxygen which is a heteroatom (Example 12).

Experimental Example 2

Rubber specimens were manufactured using the butadiene polymers prepared in Examples 1 and 2, and Comparative Example 1, and the change of mooney viscosity (ML1+4) with respect to the rubber specimens in accordance with the application of vulcanization or not was observed.

In particular, based on 100 parts by weight of the butadiene-based polymers prepared in Examples 1 and 2 and Comparative Example 1 as rubber raw materials, 70 parts by weight of graphite, 22.5 parts by weight of a process oil, 2 parts by weight of an antiaging agent (TMDQ), 3 parts by weight of zinc oxide (ZnO), and 2 parts by weight of stearic acid were mixed to prepare each rubber compound. To the rubber compound thus prepared, 2 parts by weight of sulfur, 2 parts by weight of a vulcanization accelerator (CZ), and 0.5 parts by weight of a vulcanization accelerator (DPG) were added, and vulcanization was performed at 160° C. for 25 minutes to manufacture a rubber specimen.

For a rubber specimen (Raw) manufactured by using only each of the modified polymers of Examples 1 and 2 and Comparative Example 1, a rubber specimen (CMB) manufactured after preparing a rubber compound as above and manufacturing using thereof, and a rubber specimen (FMB) manufactured by adding sulfur to a rubber compound and vulcanizing, mooney viscosity (ML1+4) was measured by using MV2000E manufactured by Monsanto Co., Ltd. using Large Rotor at 100° C. at a rotor speed of 2±0.02 rpm. In this case, a specimen used was stood at room temperature (23±3° C.) for 30 minutes or more, and 27±3 g of the specimen was collected and put in a die cavity, and then, the mooney viscosity was measured by operating Platen. The results are shown in FIGS. 1 to 3.

Figure 2:
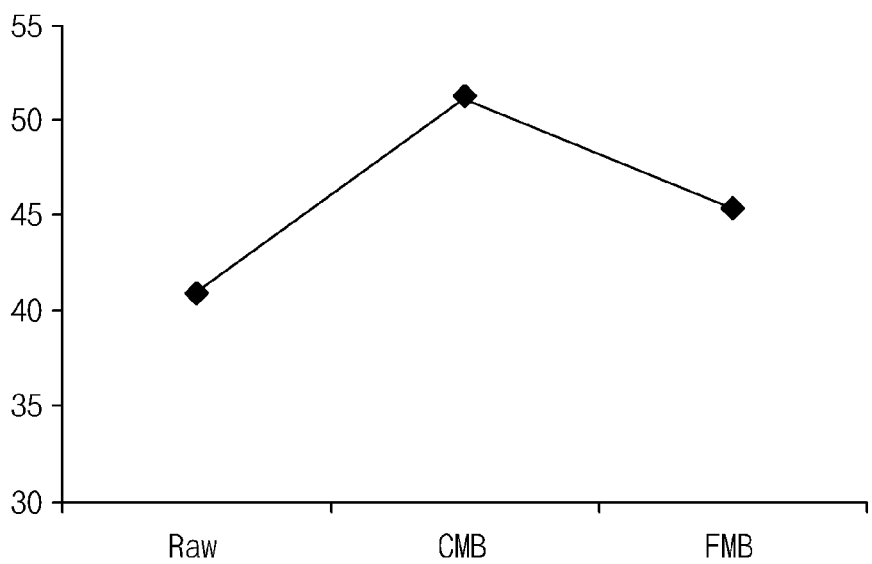
FIG. 2 is a graph obtained by observing the change of mooney viscosity (ML1+4) in accordance with the application of vulcanization or not of a rubber species which is manufactured using the conjugated diene-based polymer prepared in Example 2.
Figure 3:
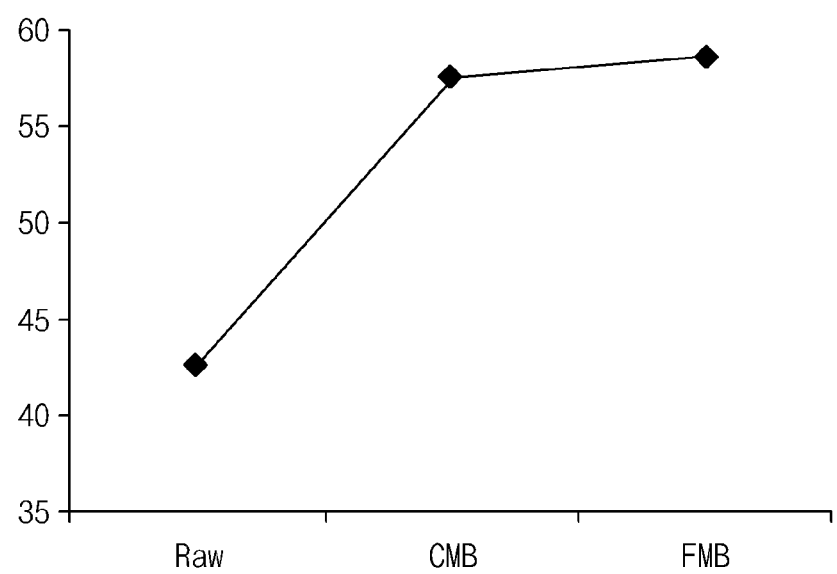
FIG. 3 is a graph obtained by observing the change of mooney viscosity (ML1+4) in accordance with the application of vulcanization or not of a rubber species which is manufactured using the conjugated diene-based polymer prepared in Comparative Example 1.

As shown in FIGS. 1 to 3, the polymers of Examples 1 and 2 as the rubber before vulcanization (CMB) showed the highest mooney viscosity, and after vulcanization, the mooney viscosity was decreased. In addition, the polymer of Example 2 showed a little mooney viscosity difference between Raw and FMB. On the contrary, the mooney viscosity of the polymer of Comparative Example 1 was gradually increased in order of Raw-CMB-FMB. From such results, the polymers of Examples 1 and 2 were found to have excellent processability when compared to that of Comparative Example 1.

Experimental Example 3

For the butadiene polymers prepared in Examples 1 to 3, and Comparative Examples 1 and 2, various physical properties were measured by the following methods, and the results are shown in Table 2.

1) Microstructure Analysis

The amounts of cis-1,4 bonds, vinyl bonds and trans bonds in the prepared butadiene polymers were respectively measured by using Fourier infrared spectroscopy and nuclear magnetic resonance spectroscopy.

2) Weight average molecular weight (Mw), number average molecular weight (Mn) and polydispersity (PDI)

The weight average molecular weight (Mw), and the number average molecular weight (Mn) of the prepared butadiene polymers were measured by gel permeation chromatography (GPC), and polydispersity (PDI, Mw/Mn) was calculated therefrom.

In particular, each of the butadiene-based polymers thus prepared was dissolved in THF for 30 minutes under 40° C. conditions and loaded on gel permeation chromatography and flowed. In this case, two columns of PLgel Olexis and one column of PLgel mixed-C manufactured by Polymer Laboratories Co., Ltd. were used in combination as columns. In addition, all newly replaced columns were mixed bed type columns, and polystyrene (PS) was used as a GPC standard material.

3) Viscosity Properties

Mooney viscosity (MV, (ML1+4 @100° C.) (MU): The mooney viscosity (MV) for the butadiene-based polymers was measured by using MV2000E manufactured by Monsanto Co., Ltd. using Large Rotor at 100° C. at a rotor speed of 2±0.02 rpm. In this case, a specimen used was stood at room temperature (23±3° C.) for 30 minutes or more, and 27±3 g of the specimen was collected and put in a die cavity, and then, the mooney viscosity was measured by operating Platen while applying torque.

−S/R value: A −S/R value was determined from a gradient value on the change of mooney viscosity, which was shown by the release of the torque when measuring the mooney viscosity.

Solution viscosity (SV) was obtained by measuring viscosity of a polymer in 5% toluene at 20° C.

tionalizing agent. From the results, the improvement of processability during preparing a rubber composition may be expected.

Meanwhile, the butadiene polymer of Comparative Example 1, which was prepared by the same method as Example 1 except for not using a functionalizing agent, showed broader molecular weight distribution and a lower −S/R value when compared to those of Examples 1 to 3, which used a functionalizing agent. Accordingly, the butadiene polymer of Comparative Example 1 showed processability deterioration as shown in the following Table 4.

In addition, the butadiene polymer of Comparative Example 2, which was prepared by not using a functionalizing agent and using a nickel-based catalyst, showed a higher vinyl content and broader molecular weight distribution when compared to those of Examples 1 to 3.

Experimental Example 4

Rubber specimens were manufactured using the butadiene polymers prepared in Examples 1 to 3, and Comparative Examples 1 and 2 by the same method in Experimental Example 1. Abrasion properties, viscoelasticity and processability were measured for the rubber specimens thus manufactured by the following methods, and the results are shown in Table 3.

TABLE 2

|  |  |  | Comparative Example 1 | Comparative Example 2 | Example 1 | Example 2 | Example 3 |
|---|---|---|---|---|---|---|---|
|  | Functionalizing agent (amount) |  | — | — | DAT (5 eq) | TAT (5 eq) | DAT (1 eq) + pBD (33 eq) |
|  | Catalyst |  | Nd-based | Ni-based | Nd-based | Nd-based | Nd-based |
| IR | Microstructure (cis/vinyl/trans) (amount ratio) |  | 96.4/0.5/3.1 | 96.2/2.0/1.8 | 97.2/0.5/2.3 | 97.2/0.5/2.3 | ND |
| GPC | Mn | g/mol | 2.49.E+05 | 1.57.E+05 | 2.06.E+05 | 1.93.E+05 | ND |
|  | Mw | g/mol | 8.47.E+05 | 7.78.E+05 | 6.28.E+05 | 5.82.E+05 | ND |
|  | Mw/Mn | — | 3.41 | 4.96 | 3.05 | 3.02 | ND |
| MV | ML1 + 4 (@100° C.) | MU | 44.8 | 43.2 | 43.9 | 40.9 | 43.7 |
|  | -S/R | — | 0.5502 | 0.7651 | 0.8395 | 0.6568 | 0.6944 |
|  | Solution viscosity (SV) |  | 276.0 | 280.0 | 369.5 | 182.4 | 134.4 |
|  | SV/MV |  | 6.16 | 6.48 | 8.42 | 4.46 | 3.08 |

In the above Table 2, ND means "not measured", and eq means equivalent.

From the experimental results, with respect to the microstructure, the butadiene polymers of Examples 1 to 3, which were prepared using a functionalizing agent showed 97% or more of the cis bond content and 0.5% or less of the vinyl bond content in a polymer, and the butadiene polymers of Examples 1 to 3 showed 0.65 or more of a −S/R value and high linearity. In addition, with respect to the molecular weight distribution, the butadiene polymer of Examples 1 to 3, which were prepared using a functionalizing agent showed a low PDI of 3.05 or less, more particularly, 3.02 to 3.05, and was found to show narrow molecular weight distribution. In addition, with respect to viscosity properties, the butadiene polymers of Examples 1 to 3, which were prepared using a functionalizing agent had SV/MV in a range of 3.08 to 8.42.

In addition, the copolymer of Example 3, which was prepared using a catalyst composition in which 1,3-butadiene was additionally added as a conjugated diene-based monomer during preparing the catalyst composition, showed markedly lower solution viscosity and SV/MV when compared to those of Examples 1 and 2 using the same func- 1) Abrasion Properties Loss volume index: $ARI_A$ (abrasion resistance index, Method A) was measured according to a method specified in the experimental standard of ASTM D5963, and was represented as an index value. The higher the value was, the better the abrasion properties was.

2) Viscoelasticity

A dynamic mechanical analyzer of TA Co., Ltd. was used. A Tan 5 value was measured by changing deformation with a frequency of 10 Hz at each measurement temperature (−70° C. to 70° C.) with a twist mode. Paignee effect was illustrated as a difference between a minimum value and a maximum value between the deformation of 0.28% to 40%. If the Paignee effect was decreased, dispersibility of a filler such as silica was improved. If the Tan 5 value at a low temperature of 0° C. was increased, wet traction was good, and if the Tan 5 value at a high temperature of 50° C. to 70° C. was decreased, hysteresis loss was decreased, and low rolling resistance of a tire, i.e., a low fuel consumption ratio became good.

3) Processability

The surfaces of vulcanized rubber sheets (FMB) manufactured using the butadiene polymers prepared in Examples 1 to 3 and Comparative Examples 1 and 2 by the same method in Experimental Example 1 were photographed by using a digital camera (sheet width=20 cm).

Based on observed results, each result was scored as 1-4 by representing near 1 when the surface state of a sheet was good and the edge portion thereof was clean, and 4 when the surface state was rough and the edge was not planar, to evaluate processability.

TABLE 3

|  | Comparative Example 1 | Comparative Example 2 | Example 1 | Example 2 | Example 3 |
|---|---|---|---|---|---|
| Functionalizing agent (amount) | — | — | DAT (5 eq) | TAT (5 eq) | DAT (1 eq) + pBD |
| Catalyst | Nd-based | Ni-based | Nd-based | Nd-based | Nd-based |
| Tanδ @ 0° C. | 0.209 (112%) | 0.208 (115%) | 0.186 (104%) | 0.210 (117%) | 0.185 |
| avg. Tanδ @ 50° C.-70° C. | 0.164 (85%) | 0.162 (88%) | 0.144 (98%) | 0.166 (85%) | 0.147 |
| Loss volume index | 100 | 89 | 109 | 101 | 107 |
| Processability | 4 | 1 | 1 | 1 | 2 |

In the above Table 3, eq means equivalent.

From the experimental results, the butadiene polymers prepared in Examples 1 to 3 using a catalyst composition including a functionalizing agent showed a higher loss volume index when compared to that of Comparative Examples 1 and 2, and were found to have better abrasion properties.

In addition, with respect to viscoelasticity, the butadiene polymers of Examples 1 to 3, which were prepared using a catalyst composition including a functionalizing agent, showed similar level of a Tan δ value at a low temperature of 0° C. as those of Comparative Examples 1 and 2, and was found to show equivalent level of wet traction. In addition, a Tan δ value at a high temperature of 50° C. to 70° C. was further smaller in general when compared to those of Comparative Examples 1 and 2, and hysteresis loss was small, and low rolling resistance of a tire, i.e., a low fuel consumption ratio was further improved.

In addition, in the vulcanized rubber specimen of the butadiene polymer of Comparative Example 1, which was manufactured using a catalyst composition not including a functionalizing agent, surface roughness at both sides of a sheet was observed considerably. On the contrary, the FMB sheets manufactured by using the butadiene polymers of Examples 1 to 3 according to the present invention showed smooth surface properties. Particularly in Examples 1 and 2, in which a Sn-based functionalizing agent was used, similar or better smooth surface properties were shown when compared to the FMB sheet manufactured by using the nickel catalyzed butadiene polymer of Comparative Example 2, which was known to have good processability. From the results, the butadiene polymer according to the present invention is expected to have good processability when manufacturing a tire, etc.

From the experimental results, rubber compositions including the butadiene polymer according to the present invention were found to show improved effects of abrasion properties, viscoelasticity, and processability in balance without leaning to one side when compared to the rubber compositions of the comparative examples.

The invention claimed is:

1. A catalyst composition for preparing a conjugated diene-based polymer, the composition comprising:
a functionalizing agent of the following Formula 1;
a rare earth metal compound;
an alkylating agent; and
a halogen compound:

$$(X_1)_a-Sn-(X_2)_{4-a}$$ [Formula 1]

in Formula 1,
a is an integer of 1 to 3,
$X_1$ and $X_2$ are each independently selected from the group consisting of a hydrogen atom, monovalent $C_{1-20}$ hydrocarbon, $-OR_a$, $-NR_bR_c$, $-SiR_dR_eR_f$, and a covalent bonding functional group, where at least one of $X_1$ and $X_2$ includes the covalent bonding functional group, where $R_a$, $R_b$, $R_c$, $R_d$, $R_e$ and $R_f$ are each independently selected from the group consisting of a hydrogen atom, $C_{1-20}$ alkyl, $C_{3-20}$ cycloalkyl, $C_{6-20}$ aryl, $C_{7-20}$ alkylaryl, $C_{7-20}$ aralkyl, $-SiR'R''R'''$, and a covalent bonding functional group, where R', R" and R'" are each independently selected from the group consisting of a hydrogen atom, $C_{1-20}$ alkyl, $C_{3-20}$ cycloalkyl, $C_{6-20}$ aryl, $C_{7-20}$ alkylaryl, $C_{7-20}$ aralkyl, and a covalent bonding functional group, and
the covalent bonding functional group is a functional group containing a carbon-carbon double bond.

2. The catalyst composition for preparing a conjugated diene-based polymer of claim 1, wherein the covalent bonding functional group is selected from the group consisting of $C_{2-20}$ alkenyl and (meth)acryl.

3. The catalyst composition for preparing a conjugated diene-based polymer of claim 1, wherein the covalent bonding functional group is selected from the group consisting of vinyl, allyl, methallyl, butenyl, pentenyl, hexenyl and (meth)acryl.

4. The catalyst composition for preparing a conjugated diene-based polymer of claim 1, wherein $X_1$ and $X_2$ are each independently selected from the group consisting of linear or branched $C_{1-6}$ alkyl, vinyl, allyl, and methallyl, where at least one of $X_1$ and $X_2$ is selected from the group consisting of vinyl, allyl, and methallyl.

5. The catalyst composition for preparing a conjugated diene-based polymer of claim 1, wherein the functionalizing agent comprises one selected from the group consisting of the following Formulae 2a to 2n, or a mixture of at least two thereof:

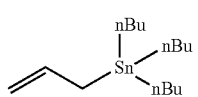

(2a)

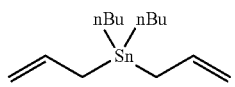

(2b)

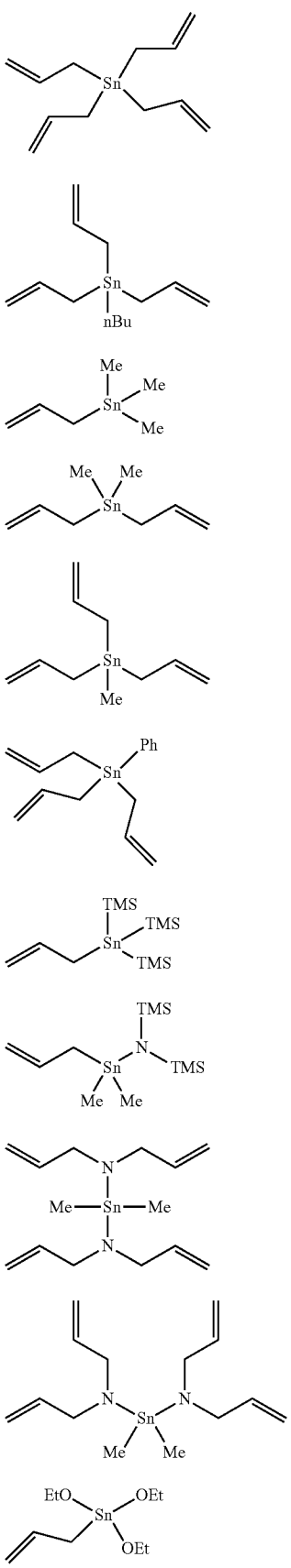

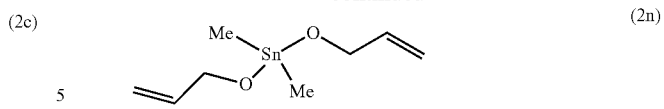

in Formulae 2a to 2n, Me means methyl, nBu means n-butyl, Ph means phenyl, TMS means trimethylsilyl, and OEt means ethoxy.

6. The catalyst composition for preparing a conjugated diene-based polymer of claim 1, wherein the rare earth metal compound comprises a neodymium compound of the following Formula 3:

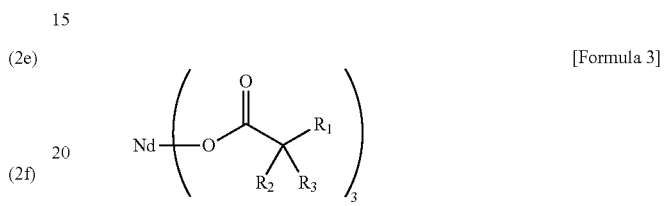

in Formula 3, $R_1$ to $R_3$ are each independently a hydrogen atom, or linear or branched $C_{1-12}$ alkyl.

7. The catalyst composition for preparing a conjugated diene-based polymer of claim 6, wherein the neodymium compound is Formula 3, in which $R_1$ is linear or branched $C_{6-8}$ alkyl, and $R_2$ and $R_3$ are each independently linear or branched $C_{2-6}$ alkyl.

8. The catalyst composition for preparing a conjugated diene-based polymer of claim 1, wherein the neodymium compound comprises one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, or a mixture of at least two thereof.

9. The catalyst composition for preparing a conjugated diene-based polymer of claim 1, wherein the alkylating agent comprises an organoaluminum compound of the following Formula 4:

in Formula 4,
R is each independently a hydrocarbyl group; or a heterohydrocarbyl group comprising at least one heteroatom selected from the group consisting of a nitrogen atom, an oxygen atom, a boron atom, a silicon atom, a sulfur atom and a phosphor atom in a hydrocarbyl structure,
X is each independently selected from the group consisting of a hydrogen atom, a halogen atom, a carboxyl group, an alkoxy group, and an aryloxy group, and
Z is an integer of 1 to 3.

10. The catalyst composition for preparing a conjugated diene-based polymer of claim 1, wherein from 5 moles to 200 moles of the alkylating agent is included based on 1 mole of the rare earth metal compound.

11. The catalyst composition for preparing a conjugated diene-based polymer of claim 1, wherein from 1 mole to 20 moles of the halogen compound is included based on 1 mole of the rare earth metal compound.

12. The catalyst composition for preparing a conjugated diene-based polymer of claim 1, further comprising one or both selected from the group consisting of a diene-based monomer and an aliphatic hydrocarbon-based solvent.

13. A method for preparing a conjugated diene-based polymer, the method comprising:
   polymerizing conjugated diene-based monomers using the catalyst composition according to claim 1.

* * * * *